April 22, 1958  S. F. MICHATEK  2,831,642
REEL MOUNTING MECHANISM
Filed Jan. 9, 1957
*Fig. 1*
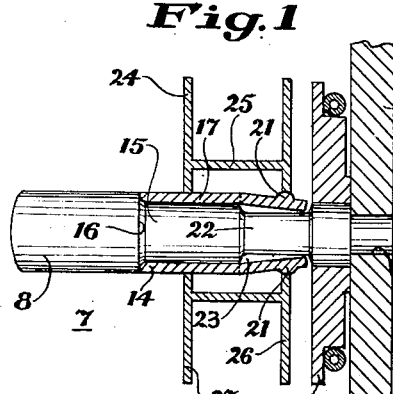
*Fig. 2*
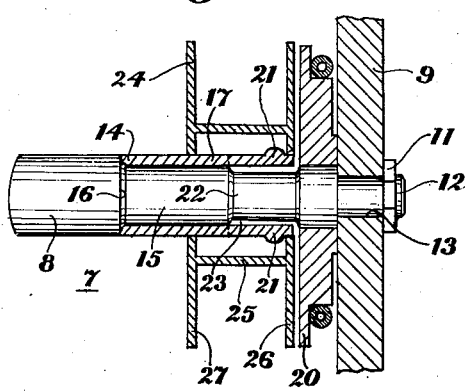
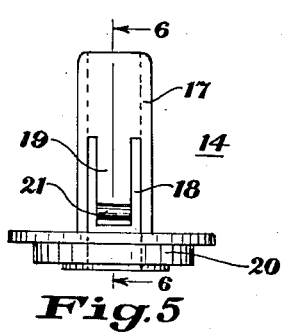
*Fig. 3*
*Fig. 4*
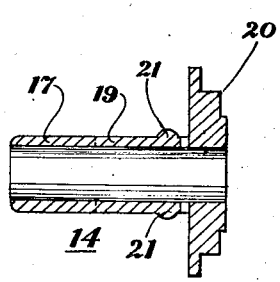
*Fig. 5*
*Fig. 6*
Stephen F. Michatek
INVENTOR.
BY Daniel I. Mayne,
Steve W. Grembow
ATTORNEYS 
United States Patent Office 2,831,642  
Patented Apr. 22, 1958

2,831,642

REEL MOUNTING MECHANISM

Stephen F. Michatek, Rochester, N. Y., assignor to Eastman Kodak Company, Rochester, N. Y., a corporation of New Jersey Application January 9, 1957, Serial No. 633,203

5 Claims. (Cl. 242—68.3)

This invention relates generally to photography and more specifically to an improved reel mounting mechanism adapted to retain a reel thereon in an operative film-winding position.

Efforts are constantly being being made to develop and produce a commercially acceptable reel mounting mechanism for use in the photographic industry. Although commercially acceptable reel mounting mechanisms have been produced in the past, applicant is unaware of any on the market that fulfill all of the primary requirements of such a mechanism, namely, ruggedness of construction, reliability of operation, simplicity of design and inexpensiveness of manufacture. Applicant's improved reel mounting mechanism is believed to more nearly achieve these objectives than any prior known structure.

Therefore, one of the primary objects of this invention is to provide an improved reel mounting mechanism of simple design and inexpensive construction.

Another object of this invention is to provide an improved reel mounting mechanism that may be readily incorporated in a camera or similar device by the addition of a few parts without necessitating extensive modification.

Still another object of the invention is the provision of an improved reel mounting mechanism comprising a reel holder mounted on a spindle and forming resilient means for retaining a reel on the holder.

Another object of this invention is the provision of an improved reel mounting mechanism of sturdy construction adapted to quickly and readily receive a reel without any undue or unnecessary binding.

Objects and advantages other than those set forth above will be apparent from the following description when read in conjunction with the accompanying drawings, in which:

Fig. 1 is a side elevation view in section of a reel mounting mechanism showing the spindle, the reel holder and the reel in a position depressing the resilient retaining means formed by the holder;

Fig. 2 is a view similar to Fig. 1 showing the reel in an operative film-winding position;

Fig. 3 is a reduced perspective view of the reel holder mounted on a spindle;

Fig. 4 is an enlarged plan view of the reel holder shown in Fig. 3;

Fig. 5 is a side elevation view of the reel holder of Fig. 4; and

Fig. 6 is a section view taken along line 6—6 of Fig. 5.

As shown in Figs. 1 and 2, this invention is illustrated as applied to a reel mounting mechanism 7 of the type readily applicable to cameras and projectors although not limited to this use alone. The reel mounting mechanism 7 comprises essentially a spindle 8 rigidly secured to a camera frame 9 by a nut 11 engaging the threaded end 12 of the spindle 8 which extends through an opening 13 formed by the frame 9. A reel holder 14 which is rotatably mounted on a cylindrical portion 15 of the spindle 8 and retained thereon by a shoulder 16 formed by the spindle comprises an axially extending, reel receiving hub member 17 merging with a base to form a pulley 20. The hub member 17 is provided with U-shaped slots 18 to form a pair of oppositely disposed resilient fingers 19 each of which have one end free and the opposite end integrally formed with the hub member 17. Each of the fingers 19 are further provided along their free end with a projection shown as a ridge 21 extending beyond the periphery of the hub member 17 to form a retaining means for a purpose to be explained hereinafter. When the reel holder 14 is operatively mounted on the spindle 8, the fingers 19 thereof register with a peripheral groove 22 formed by the spindle 8 which cooperates with the reel holder 14 to define an annular recess 23 therebetween. A reel 24 adapted to be disposed on the reel holder 14 is formed of an annular hub 25, upon which the film is wound, connected at its ends to leading and trailing circular disks 26 and 27 respectively. The disks 26 and 27 are provided with registering axial openings conforming to the configuration of the outer periphery of the hub member 17 and cooperating therewith when the reel 24 is slidably moved thereover.

In the operation of this invention, the reel holder 14 is initially disposed on the cylindrical portion 15 of the spindle 8 and the threaded end 12 of the spindle inserted through the opening 13 in the camera frame 9 and the spindle secured thereto by the nut 11. A reel is disposed on the hub member 17 and axially moved thereon into an operative film-winding position. As the leading disk 26 of the reel 24 engages the ridges 21 and passes thereover, the fingers 19 are depressed inwardly as shown in Fig. 1 with the fingers extending into the annular recess 23 existing between the spindle 8 and the hub member 17. When the reel 24 is moved axially inwardly into an operative film-winding position as shown in Fig. 2, the resilient fingers 19 resume their original position with the ridges 21 cooperating with the leading disk 26 to retain the reel 24 on the spindle 8.

Although but one embodiment has been illustrated and described, it will be apparent to those skilled in the art that various changes and modifications may be made therein without departing from the spirit of the invention or from the scope of the appended claims.

It is claimed and desired to secure by Letters Patent

1. In a reel mounting mechanism adapted for the removable mounting of a reel thereon, the combination of a base; a spindle fixedly mounted to said base; a cylindrical portion formed by said spindle and merging therewith to form a shoulder; a reel holder rotatably mounted on said cylindrical portion, said reel holder being interposed between said shoulder and said base; a pulley formed by one end of said reel holder through which rotation is imparted thereto, and the other end thereof forming a reel receiving portion having an outer periphery complementary to the axial opening of said reel; an axially extending resilient finger formed by said reel receiving portion having one end integral with said reel receiving portion and the opposite end free and disposed adjacent said pulley, said finger further forming a ridge adjacent said free end extending outwardly of the periphery of said reel receiving portion; and clearance means formed by said cylindrical portion of said spindle in register with said finger to permit depression of said finger therein when said reel passes over said ridge as it is mounted on said spindle, said ridge cooperating with said reel to retain said reel on said reel holder when said finger returns to its original position.

2. In a reel mounting mechanism adapted for the removable mounting of a reel thereon, the combination of a base; a spindle fixedly mounted to said base; a cylindrical portion formed by said spindle and merging there with to form a shoulder; a reel holder rotatably mounted on said cylindrical portion, said reel holder being interposed between said shoulder and said base; drive means formed by one end of said reel holder through which rotation is imparted thereto; a reel receiving portion formed by the other end of said reel holder and having an outer periphery complementary to the axial opening of said reel, said reel receiving portion being provided near one end with a substantially U-shaped slot to form an axially extending resilient finger having one end integral with said reel receiving portion and the opposite end free, said finger further forming a projection adjacent said free end extending outwardly of the periphery of said reel receiving portion; and clearance means formed by said cylindrical portion of said spindle in register with said finger to permit depression of said finger therein when said reel passes over said projection as it is mounted on said spindle, said projection cooperating with said reel to prevent withdrawal thereof when said finger returns to its original position.

3. In a reel mounting mechanism adapted for the removable mounting of a reel thereon, the combination of: a base; a spindle fixedly mounted to said base; a cylindrical portion formed by said spindle and merging therewith to form a shoulder; a reel holder rotatably mounted on said cylindrical portion, said reel holder being interposed between said shoulder and said base; a pulley formed by one end of said reel holder through which rotation is imparted thereto; a hub member adapted to receive a reel formed by the other end of said reel holder and having an outer periphery complementary to the axial opening of said reel, said hub member being provided near one end with a substantially U-shaped slot to form an axially extending resilient finger having one end integral with said hub member and the opposite end free, said finger further forming a ridge adjacent said free end extending outwardly of the periphery of said hub member; and said cylindrical portion of said spindle cooperating with said hub member to form a recess in register with said finger to permit depression of said finger therein when said reel passes over said ridge as it is mounted on said spindle, said ridge cooperating with said reel to prevent withdrawal thereof when said finger returns to its original position.

4. A reel holder of unitary construction for mounting a reel thereon comprising: a hollow reel receiving portion having an outer periphery complementary to the axial opening of said reel, said reel receiving portion being provided near one end with a substantially U-shaped slot to form an axially extending resilient finger, said finger having one end integral with said reel receiving portion and the opposite end free; drive means formed by said reel holder adjacent to said one end of said reel holder; and a projection formed by said free end of said finger extending beyond the outer periphery of said reel receiving portion whereby said reel in passing thereover as it is mounted on said reel holder depresses said projection and finger, said finger returning to its original position with said projection cooperating with said reel to retain said reel on said reel holder.

5. A reel holder of unitary construction for mounting a reel thereon comprising: a hollow hub member having an outer periphery complementary to the axial opening of said reel and adapted to receive said reel, said hub member being provided near one end with a substantially U-shaped slot to form an axially extending resilient finger, said finger having one end integral with said hub member and the opposite end free; a pulley adjacent to said one end of said hub member through which rotation is imparted to said reel holder; and a ridge formed by said free end of said finger extending beyond the outer periphery of said hub member whereby said reel in passing thereover as it is mounted on said reel holder depresses said ridge and finger, said finger returning to its original position with said ridge cooperating with said reel to retain said reel on said reel holder.

References Cited in the file of this patent
UNITED STATES PATENTS
1,829,482    Hayden _____ Oct. 27, 1931